(12) United States Patent
Asher et al.

(10) Patent No.: US 7,877,202 B1
(45) Date of Patent: Jan. 25, 2011

(54) METHOD AND SYSTEM FOR AUTOMATED TICKET GEOCODING AND ESTIMATING POSITIONAL ERRORS

(75) Inventors: Michael Asher, Green Cove Springs, FL (US); Christopher Giles, Auburn, AL (US); Harold J. Stewart, Cumming, GA (US)

(73) Assignee: AT&T Intellectual Property, II LP, Reno, NV (US)

( * ) Notice: Subject to any disclaimer, the term of this patent is extended or adjusted under 35 U.S.C. 154(b) by 953 days.

(21) Appl. No.: 11/735,697

(22) Filed: Apr. 16, 2007

(51) Int. Cl.
*G01C 21/00* (2006.01)
(52) U.S. Cl. .................. 701/207; 701/208; 701/214
(58) Field of Classification Search ......... 701/207–214, 701/300; 340/995.14
See application file for complete search history.

(56) References Cited

U.S. PATENT DOCUMENTS

| | | | |
|---|---|---|---|
| 6,751,554 B1 | 6/2004 | Asher et al. | |
| 6,958,690 B1 * | 10/2005 | Asher et al. | 340/531 |
| 7,039,640 B2 | 5/2006 | Miller et al. | |
| 7,158,878 B2 | 1/2007 | Rasmussen et al. | |
| 7,167,187 B2 | 1/2007 | Scott et al. | |
| 7,197,160 B2 | 3/2007 | Rhoads et al. | |
| 7,640,105 B2 * | 12/2009 | Nielsen et al. | 701/213 |
| 2006/0245572 A1 | 11/2006 | Asher et al. | |

* cited by examiner

*Primary Examiner*—Richard M. Camby
(74) *Attorney, Agent, or Firm*—Fay Kaplun & Marcin, LLP

(57) ABSTRACT

A system and method for receiving a geocode request for a location including a textual description of the location, selecting a test for geocoding the location, geocoding the location using the selected test and determining a bounding area around the location indicating at least one maximum distance range from the location.

19 Claims, 4 Drawing Sheets

US 7,877,202 B1

METHOD AND SYSTEM FOR AUTOMATED TICKET GEOCODING AND ESTIMATING POSITIONAL ERRORS

BACKGROUND

The protection of buried assets and facilities, such as fiber optic cables, electrical power lines, water mains, etc, is of paramount concern to communication and utility companies. In order to prevent the risk of damaging underground assets and facilities, communications and utility companies actively encourage anyone involved in excavation projects to notify the companies prior to digging into the ground. Services, such as the national and regional "Call Before You Dig" organizations and the "811" telephone number, have been created to centralize the response to such calls and notify the interested companies of the planned excavation. Several thousand notifications may be received on a given day and "dig location tickets" are created to track the status of each of the notifications. The ticket is typically a record within a database containing information such as the identity of the caller, a date the notification was received, a planned excavation date, an estimated location of the excavation, etc. Since each of the numerous tickets may indicate a potentially damaging excavation activity, companies typically use a geocoding system to assist with the processing of the tickets.

Geocoding is the process of converting textual data into a physical location. The most common from of geocoding conversion is translating a street address into geographic coordinates expressed in latitude and longitude values. Through the use of the geographic coordinates, the textual data (e.g., street address) may be mapped and entered onto a geographical information system ("GIS"). A GIS is a system for collecting, storing, analyzing, and managing data and attributes related to spatial and geographic data, or location information. GIS systems may manage large databases of location information, wherein the databases are maintained through continuously adding new location information and updating existing location information. Specifically, a computer system utilizing a GIS capable of integrating, storing, editing, analyzing, sharing and displaying geographically referenced information.

Geocoding is a large industry, having many vendors selling datasets costing over $100,000. Furthermore, many corporations base multi-million dollar decisions on the accuracy of the datasets. However errors occurring in the geocoding process create positional discrepancies. The errors include errors inherent in the data itself as well as quantization errors resulting from the selection of the closest United States Postal Service ("USPS") address of a desired point. For example, an excavation point may lie within an empty field behind a row of houses. The location of the project may be expressed in the form of a USPS street address of the nearest house. However, the nearest street address may be several dozens of meters away, if not several miles away in the case of a rural location. If a critical business decision is to be made on this project, an error in estimating the location can result in enormous costs, such as the destruction of company assets and utility facilities.

SUMMARY OF THE INVENTION

A method for receiving a geocode request for a location including a textual description of the location, selecting a test for geocoding the location, geocoding the location using the selected test and determining a bounding area around the location indicating at least one maximum distance range from the location.

A system having a plurality of geocoding tests for converting a textual description of a location into a geocoded point, an error estimation application determining the likelihood a particular geocoding test will be selected as an optimal test and selecting the optimal test and an asset management device performing the optimal test and defining a bounding box around the geocoded point indicating at least one maximum distance range from the geocoded point to the location.

DETAILED DESCRIPTION

Figure 1:
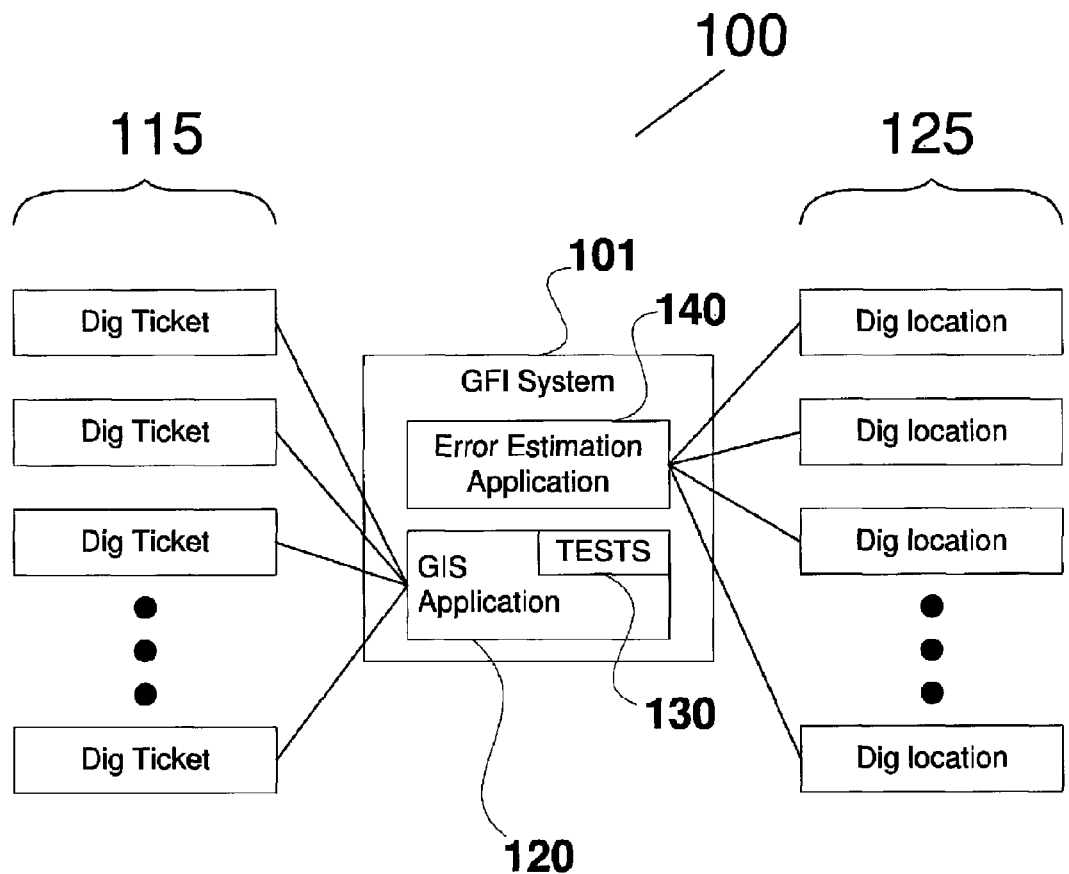
FIG. 1 shows an exemplary system for estimating a positional error in one or more estimated dig locations according to the present invention.

The present invention may be further understood with reference to the following description of exemplary embodiments and the related appended drawings, wherein like elements are provided with the same reference numerals. The present invention is related to systems and methods for estimating positional errors in geocoding locations based on textual data, such as geographic coordinates. Specifically, the present invention is related to systems and methods for determining the total amount of error possible from geocoding software using street address information and utilizing an exemplary function to correct the determined error. Furthermore, the present invention is related to systems and methods determining an optimal test to use when geocoding a dig location ticket.

The current state of the art in geocoding software does not allow for the determination of the total amount of error possible when geocoding a dig ticket. Typically, quantization errors may exist due to the format of street-level datasets in the current geocoding software. As opposed to containing the actual locations for street addresses, the datasets contain endpoint location for data items referred to as "address block ranges." The latitude and longitude values of a given street address is based off the location of these endpoints, wherein the location of the requested street address is adjusted based off linear interpolation of the numeric street number within the address block range. For example, in order to locate the street address of 250 Elm Street, a location is presumed to be at the midway point between the endpoints of the "200-300 Elm Street" address block range. Accordingly, the location of 225 Elm Street is presumed to be at a distance one quarter of the way from the first endpoint. This technique is obviously inaccurate in the cases where the street addresses are not precisely positioned along an address block range according to the numeric value of the requested street address.

The exemplary systems and methods may automatically process a dig ticket and may determine whether or not the dig location of the ticket is near an underground facility. For example, if an exemplary geocoded address is located within 200 meters of a company asset (e.g., a buried cable), and the maximum error may be determined to be 100 meters, then the dig location may be safely excluded from "touching" the assets. In other words, the exemplary systems and methods may verify if the dig location falls within a tolerance zone of the asset or facility, wherein the tolerance zone may be the width of the asset or facility plus a supplemental "buffer" on either side of the asset or facility. Thus, for any industry that regularly relies upon such geocoded data, the exemplary embodiments allow for a precise statement to be made as to the estimated dig location, regardless of any imprecision inherent in the data.

FIG. 1 shows an exemplary system 100 for estimating a positional error in one or more estimated dig locations 125 according to the present invention. The exemplary system 100 allows for increased accuracy in both inclusion and exclusion tests of the estimated locations 125. The exemplary system 100 may include an asset management system, such as a geo-link fiber integrity ("GFI") ticket manager system 101. The exemplary GFI system 101 may be located within a network protection center that provides operation services, hardware, software and system integration for a plurality of dig tickets, such as, for example, dig tickets 115. The dig tickets 115 may contain textual data providing alerts for various underground assets and facilities such as cable, electric, gas, water, sewer, telecommunications, etc. Specifically, each of the dig tickets 115 may provide log information on the underground excavation required to process the ticket, such as, for example, the identity of the excavator or contractor, a ticket number, a dig time and date, a dig location (street number, city, county, and state), grid information, miscellaneous comments, etc.

The GFI system 101 may be capable of processing tens of thousands of dig ticket requests per day from regional and national call centers. The dig ticket 115 may be transmitted to the GFI system 101 from call centers, or directly from an excavator or contractor, through various communication means, such as telephone, facsimile, e-mail, Internet browser, etc. Each of the dig tickets 115 received by the GFI system 101 may be stored on a file server and be made available for viewing, printing, reporting, and storing in a removable memory.

The operations performed by the GFI system 101 may include receiving, screening, distributing, and managing the dig tickets 115, wherein each dig ticket 115 includes a reference to a specific dig location 125. Furthermore, the GFI system 101 may include a GIS application 120 for processing (e.g., geocoding) the textual data of the dig tickets 115. The GIS application 120 may read the textual data on each of the dig ticket 115 and convert the data into an appropriate format, readable by the GFI system 101. In addition, any of the tickets 115 that include errors or insufficient data may be set aside or discarded by the GFI system 101. Users of the GFI system 101 may edit erroneous data or add missing data to the tickets 115 and resubmit the ticket to the GIS application 120.

The GIS application 120 may include a plurality of tests 130 that may be employed to determine dig locations 125 for each of the dig tickets 115. According to the exemplary embodiment of the present invention, each one of the tests 130 may be an independent, or semi-independent, method of obtaining an estimated geographic location (e.g., latitude and longitude coordinates), such as, the dig locations 125, from the textual data within each of the dig ticket 115. While each of the tests 130 may return differing dig locations for any given ticket, the exemplary embodiment of the present invention is capable of determining which of the tests 130 is optimal for a given ticket. The optimal test performed by the GFI system 101 may vary depending on several factors (e.g., the time and location of the dig request, etc.). The procedures used to determine the optimal tests will be described in further detail below.

The GFI system 101 may further include an error estimation application 140. According to an embodiment of the present invention, upon receiving an address of one of the dig locations 125, the error estimation application 140 of the GFI system 101 may use a maximum error may as a correction function to test that address for inclusion or exclusion from a given area within the GFI system 101. Specifically, the error estimation application 140 may calculate a street density of a given location, as well as accurately estimating the physical location of a street address. Both of these techniques allow for extremely precise determination of the error inherent in the geocoded dig locations 125 provided by the GIS application 120. As will be described in further detail below, the error estimation application 140 may be used to define a "bounding box" in which the dig location 125 may be contained within, or conversely, a separate region from which the dig location 125 may be outside.

Figure 2:
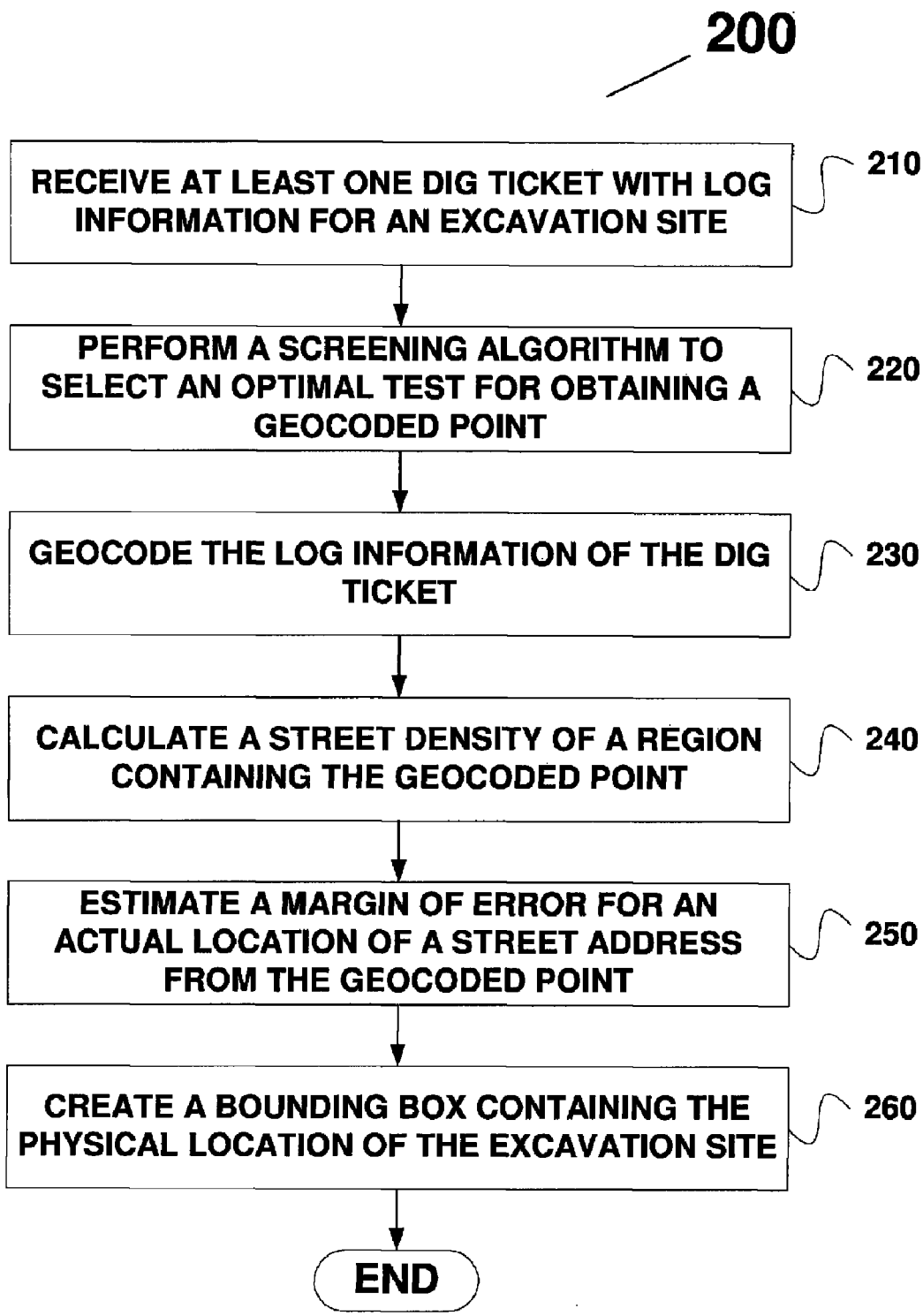
FIG. 2 shows an exemplary method for estimating a positional error in one or more estimated dig locations according to the present invention.

FIG. 2 shows an exemplary method 200 for estimating a positional error in one or more estimated dig locations 125 according to the present invention. This method 200 also allows for a reinforced learning algorithm for automated geocoding of a dig location 125 for one or more of the dig tickets 115. The exemplary method 200 will be described with reference to the exemplary system 100 of FIG. 1. While the exemplary embodiments of system 100 and method 200 apply the present invention to organizing geographical data on the GFI system 101, the present invention may be used to estimate the positioning errors associated with translating textual data (e.g., street addresses) into physical locations (e.g., latitude and longitude coordinates). While the exemplary system 100 and method 200 are described herein as systems and methods using an exemplary GIS application 120, the present invention may also be used in conjunction with any type of cartographic software system and/or mapping application In step 210, the GFI system 101 may receive at least one dig ticket 115 from a user, wherein the dig ticket 115 includes a reference to a requested dig location 125. As described above, each of the dig tickets 115 received by the GFI system 101 may provide log information on an excavation project within the requested dig location 125. The log information such as a dig location indicating street number, city, county, and state, the identity of the excavator or contractor, a dig time and date, etc. Once the dig ticket 115 is received, the GFI system 101 may immediately stored the log information for easy retrieval, reporting, and processing.

In step 220, the GFI system 101 may perform a screening algorithm to select an optimal test for obtaining a geocoded point of the excavation site. According to the exemplary embodiment of the present invention, the GFI system 101 may utilize a plurality of tests 130 while geocoding the dig ticket 115 in order to determine the more accurate geocoded point. As described above, each of the tests 130 may be a method of obtaining the physical location of an excavation site based on the textual information provided on the dig ticket 115. However, due to the fact that each of the tests 130 may indicate a different location as the geocoded point, the exemplary method 200 of the present invention may utilize a screening algorithm to select the optimal, or most appropriate, test 130 for any of the given dig tickets 115. As noted above, a geocoded point that is inaccurate representation of an excavation site may result in delays in processing the dig request, injury to the excavating personnel, and/or damage to underground assets and facilities. Thus, in step 220 of the method 200, the GFI system 101 may determine the accuracy of the plurality tests 130 in order to select an optimal test specific to the dig ticket 115.

The optimal test may vary for each of the dig tickets 115 based on excavation time, dig location, and other factors. According to the exemplary embodiment, the method 200 may "learn" or determine the optimal test based upon a system of rewards and penalties for each of the tests 130. In other words, the step 220 may continuously increase the overall accuracy of the geocoding process by favoring specific tests 130 that perform appropriately, while disfavoring any tests 130 that perform erroneously.

The screening algorithm used by the exemplary embodiment of the present invention may use a one-time preloaded array of weight coefficients. For a given number of tests 130 performable by the GIS application of the GFI system 101, the array may be as wide as the number of tests 130 (e.g., one array value per test). Furthermore, the array may be preloaded with an initial value of "1." The GFI system 101 may maintain separate arrays for geographic sub-regions within the GIS application. For example, the GFI system 101 may maintain an array for each county within the GIS application. The values within each of these arrays may persist across individual geocoding operations.

For a given geocoding operation, the current values of the specific array of weight (W) may be loaded. The plurality of tests 130 may be performed in parallel, wherein any of the unsuccessful test results may be discarded and the successful tests results may be assigned a confidence factor (C). The confidence factor (C) may indicate the relative degree of a certainty/uncertainty in the result of a given test 130 in which it is assigned, wherein the confidence factor (C) may be based on the specific textual data present on the dig ticket 115 that is being geocoded by the GFI system 101. Furthermore, the confidence factor (C) may be a value from zero (0) to unity.

The array of confidence factors (C) may be individually multiple (e.g., piecewise) against the array of weights (W). In other words, for a given test 130, such as test "t," the confidence factor for that test ($C_t$) is multiplied by the weight coefficient ($W_t$), and the resultant value may be an index number to allow the GFI system 101 to determine a degree of confidence for test t. Thus, each one of tests 130 may have a corresponding index number ($I_t$) for a specific dig ticket 115 computed from the equation: $I_t=(W_t C_t)$. The index number having the highest value may indicate the optimal test having the highest degree of confidence. Therefore, the GIS application of the GFI system 101 may select the test 130 with the highest index number as the optimal geocoding test for the dig ticket 115.

According to the exemplary embodiment of the present invention, the method 200 may adjust the weight coefficient ($W_t$) for each of the tests 130 based on the performance of the test 130. Specifically, the method 200 may increase, or reward, a specific weight coefficient ($W_t$) when the corresponding test 130 performs appropriately. Likewise, the method 200 may decrease, or penalize, a specific weight coefficient ($W_t$) when the corresponding test 130 performs improperly. Accordingly, the initial performances of each of the tests 130 (e.g., individual geocoding operations) may be presumed to be performing appropriately. Therefore, the GFI system 101 may continue to increase the respective weight coefficients ($W_t$) of each of the tests 130 until one of tests 130 produces an error. Specifically, the error may be an assignment error, wherein the performance of one of the tests 130 results in the dig ticket being assigned to an improper technician. Thus, in the absence of any assignment errors, the value of the weight coefficients ($W_t$) may increase monotonically. According to one embodiment of the present invention, the weight coefficient ($W_t$) may increase to a predefined maximum, such as, for example, three times the initial weight coefficient ($3W_{init}$).

However, if any of the tests 130 performed result in an error, the weight coefficient ($W_t$) may be penalized accordingly. For example, if a dig ticket 115 is assigned to the wrong technician, the dig ticket 115 may be returned to the GFI system 101 via a "transfer" or "reassignment" operation. Thus, when a test 130 yields an error (e.g., erroneous assignment, etc.), the penalized adjustment may be a subtraction from the weight coefficient ($W_t$). Similar to the embodiment including a predefined maximum for rewarding the weight coefficient ($W_t$), there may be a predefined minimum for penalizing the weight coefficient ($W_t$), such as, for example, one-third of the initial weight coefficient ($W_{init}/3$).

According to an embodiment of the present invention, the relative amount subtracted from the weight coefficient ($W_t$) may be considerably larger than the amount rewarded, such as, for example, by a factor of one or two orders of magnitude. Repeated penalties to any given test 130 will make than the GFI system 101 less likely to select that particular test 130 for geocoding a dig ticket within a given area. Likewise, repeated rewards will make any test 130 more likely to be selected by the GFI system 101. As described above, the confidence factor ($C_t$) for a given test 130 may vary based on time, region, etc. Therefore, the GFI system 101 may automatically learn the optimal test choice(s) for the various times and regions. Should there happen to be any changes in the local conditions for any region that would cause a shift in the optimal test choice(s), the GFI system 101 may automatically adjust, or relearn, new values as part of the normal process for determining which test choices are optimal.

It is important to note that with larger reward and penalty values, the adjustments to the screening algorithm will be more responsive to individual results. However, the use of overly large values may result in undamped oscillation, thereby adversely affecting the overall performance of the screening algorithm. Furthermore, adjustments to the ratio of the reward value to the penalty value may also allow for optimizing the performance of the screening algorithm. According to one embodiment of the present invention, the magnitude of the ratio may be near an assignment defect rate of the GFI system 101.

In step 230, the GFI system 101 may process, or geocode, the log information included with the dig ticket 115 through the use of the GIS application 120. Specifically, the dig ticket 115 may be geocoded according to the optimal test selected by the GFI system 101 in step 220. Thus, the GFI system 101 may generate a specific geocoded point corresponding the street address provided by the dig ticket 115.

In step 240, the error estimation application 140 of the GFI system 101 may calculate a street density of a region containing the geocoded point 301. As discussed above, a traditional geocoding process creates positional errors when estimating the physical location of an excavation site. While an excavation site may be expressed as the street address of the closest residence, the location of that residence may be several dozen meters, if not miles, away from the actual excavation site. In order to improve the positional errors, the exemplary method 200 may determine the number of differing streets that lie within the requested region, thereby calculating the street density of the region. Specifically, the method 200 may calculate the street density in order to determine the maximum uncertainty from the errors associated with estimating the physical location through geocoding a street address.

According to the exemplary method 200 of the present invention, the error estimation application 140 may use the geocoded point 301 from step 230 as a starting point. As depicted in the street map 300 of FIG. 3, the error estimation application 140 may extend opposing longitudinal vectors from the geocoded point 301 in a north (N) and a south (S) direction, and also may extend opposing latitudinal vectors from the geocoded point 301 in an east (E) and a west (W) direction. Each of the vectors (N, S, E, W) may be extended until it intersects with a street other than the street given as the initial address on the dig ticket 115. Accordingly, the extension of the four vectors (N, S, E, W) may form a rectangle 305 containing at least two different streets, wherein the longitudinal length of the rectangle 305 is the sum of the N and S vectors and the latitudinal width of the rectangle 305 is the sum of the E and W vectors. It should be noted that the rectangle 305 may possibly contain four or more streets, as some streets may lie within the rectangle 305 while not intersecting with one of the four vectors due to an oblique running angle, irregular street design, or various other factors.

According to an exemplary embodiment of method 200, the shorter of the two longitudinal vectors (N and S) may be discarded, and the shorter of the two latitudinal vectors (E and W) may be discarded. The remaining two vectors may then be combined through vector addition (e.g., via the Pythagorean Theorem as the vectors of the rectangle 305 are orthogonal) in order to form a diagonal vector D. The magnitude of the vector D may be halved, as the expectation value of the maximum error is halfway between the two endpoints of the longest latitudinal and longitudinal vectors. Thus, the value of the half of vector D determines the street density in order to provide the maximum uncertainty for a given geocoded point 301.

Figure 3:
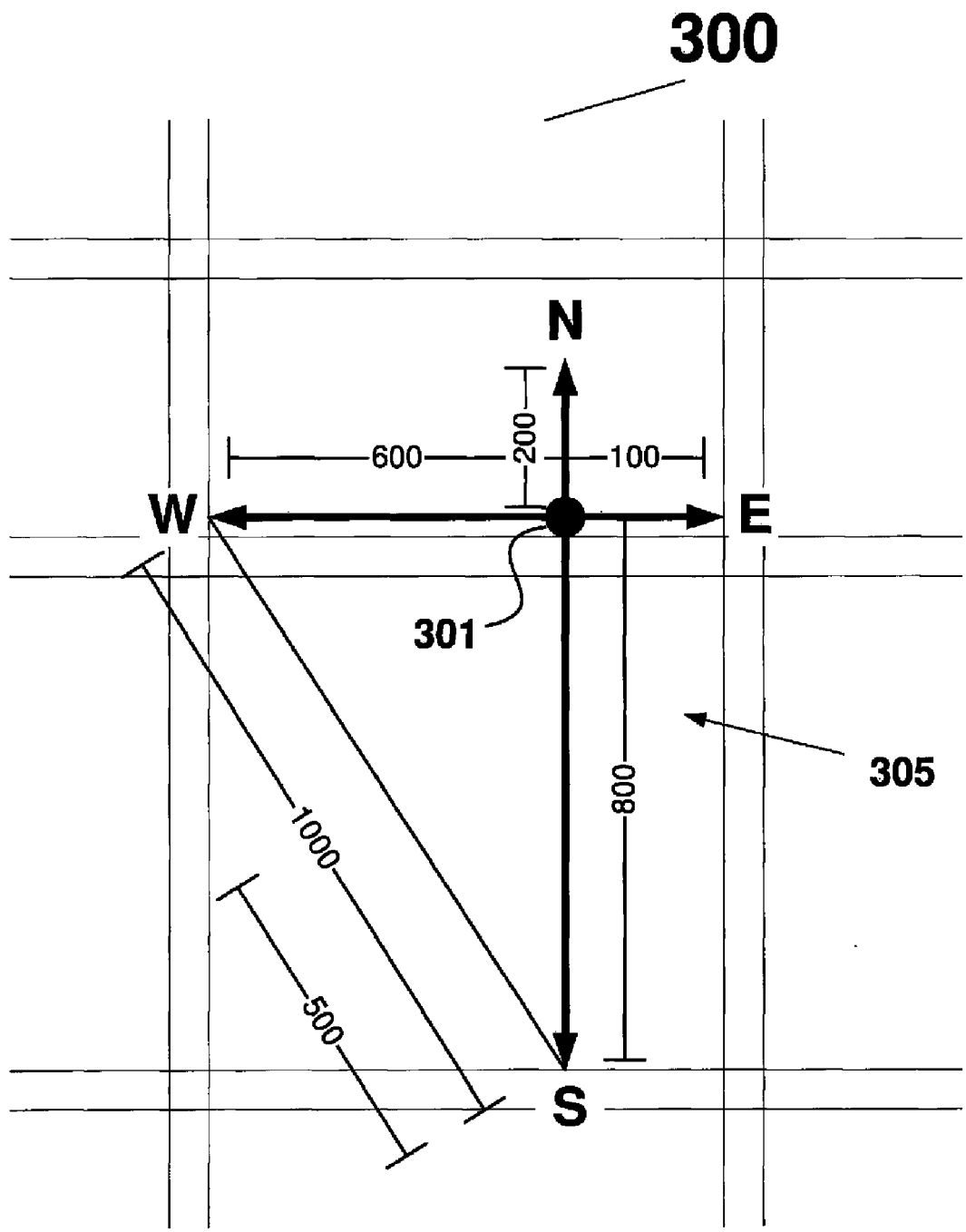
FIG. 3 shows an exemplary method for calculating a maximum uncertainty value using street density according to the present invention

For example, as illustrated in FIG. 3, the exemplary vector N may have value of 200 meters, while the exemplary vector S may have a value of 800 meters. Furthermore, the exemplary vector E may have value of 100 meters, while the exemplary vector W may have a value of 600 meters. Accordingly, the shorter vectors N and E may be discarded and the longer vectors S and W may be combined through vector addition to form the diagonal vector D. As calculated through the Pythagorean Theorem ($D^2=S^2+W^2$), the length of vector D may be determined to be 1000 meters. As described above, the value of vector D is halved in order to provide a maximum uncertainty value of 500 meters.

In step 250, the error estimation application 140 of the GFI system 101 may estimate a margin of error for an actual location of a street address from the geocoded point 301. Traditional geocoding processes create positional errors when estimating the physical location of an excavation site due to the format used in traditional street level databases. Specifically, street level databases do not store the actual latitude and longitude values of a requested street address. Thus, none of the traditional databases contain the actual location for the requested street address. Instead, these databases contain endpoint locations for datasets known as address block ranges ("ABRs"). For example, a search performed on the requested street address of 120 Elm Street using traditional street level databases would return with an estimated point within the ABR of 100-200 Elm Street using linear interpolation. However, this technique may be inaccurate in the cases where the addresses are not evenly distributed along the ABR.

According to the exemplary method 200, the estimated point within an ABR may be expanded into a bounding range in order to account for the maximum error possible for the linear interpolation of the ABR. The dimension for the bounding range may be determined through converting a numeric street address into a percentage of the distance between endpoints of the ABR. To compute this, the numeric address may be subtracted from closest of the two endpoints to yield a difference, and the absolute value of the difference may be taken of this value to eliminate negative figures. This value may then be converted into a percentage by dividing the value by the numeric size of the ABR (e.g., the distance between the ABR endpoints). It should be noted that for an exemplary value lying exactly midway between the two ABR endpoints, this calculation may provide a maximum percentage of 50%. The resultant percentage value may then be multiplied by the physical length of the ABR (e.g., the geographic distance, in meters, between the two endpoints).

For example, using the exemplary address of 120 Elm Street within the ABR of 100-200 Elm Street, the exemplary method 200 may determine the maximum error possible from a geocoded point for that address. The number address value 120 is closest to the 100 endpoint value of the ABR then the 200 endpoint value, and the absolute value of the difference in value is 20 (120-100). With the numeric size of the ABR is 100 (200-100), the value of 20 is converted into a percentage of 20% by dividing the value by the number size of the ABR (20/100). Finally, the percentage value is multiplied by the physical length of the ABR in order to calculate the maximum error possible for the ABR. Therefore, if the exemplary ABR has a physical length of 500 meters, then the resulting distance for 120 Elm Street would be a margin of error of 100 meters (20%×500 meters). Thus, the actual location of the street address of 120 Elm Street may be presumed to lie along the requested street, within the bounding range of 100 meters of the geocoded point 301. In other words, opposing vectors of 100 meters may extend from the geocoded point 301 to determine the margin of error possible for the physical location of the street address.

In step 260, the error estimation application 140 of the GFI system 101 may combine the maximum uncertainty value resulting from the step 240 calculation with the bounding range value resulting from the step 250 calculation. The combination of the two calculations may create a bounding box, wherein the physical location of the excavation site must definitely lie within, or alternatively, a region in which the physical location definitely does not lie within. The bounding box may use the maximum uncertainty value based on the street density to extend the box in opposing directions, perpendicular to the street direction. Furthermore, the bounding box may have a width along the requested street of the bounding range.

Figure 4:
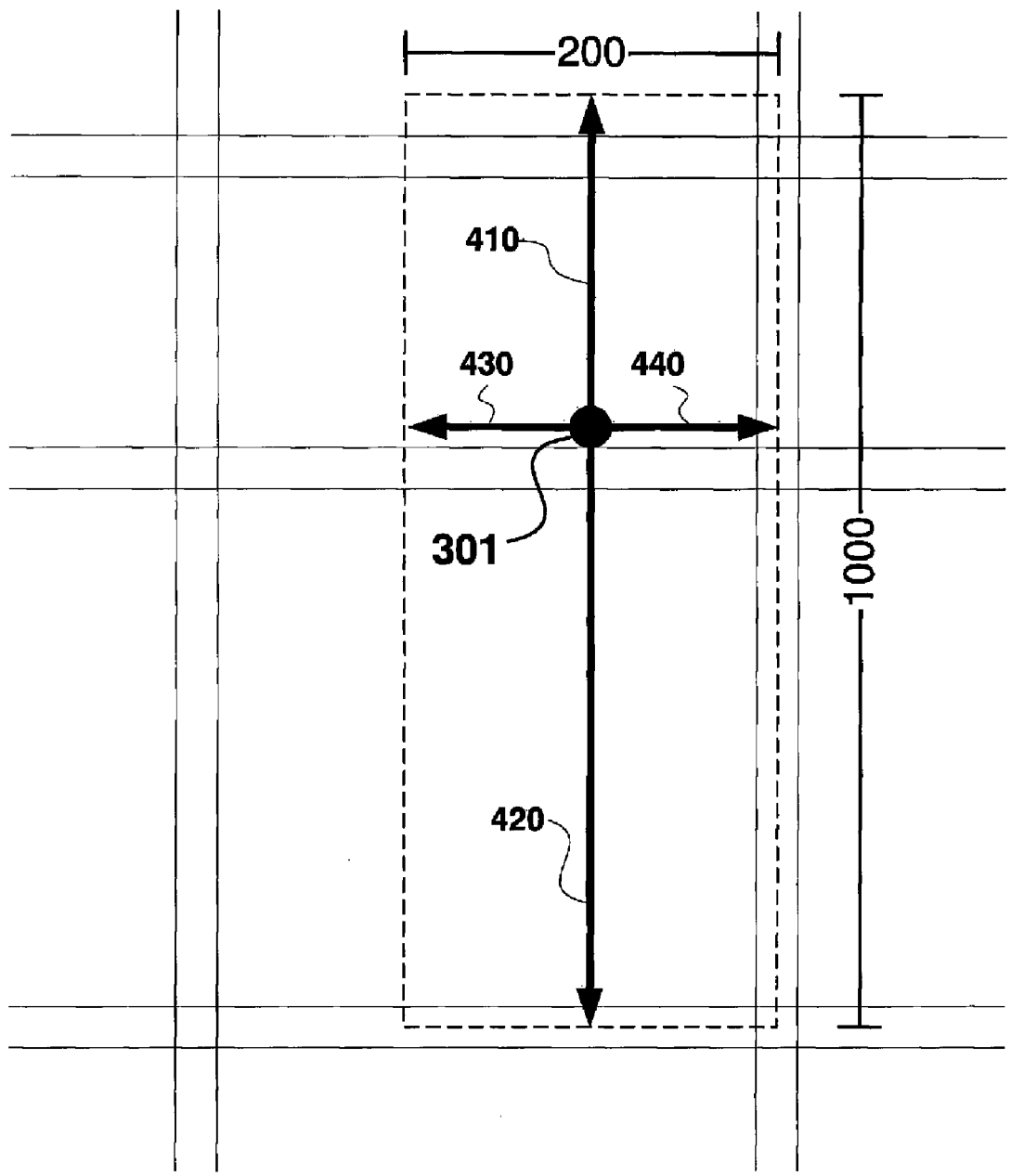
FIG. 4 shows an exemplary bounding box around a geocoded point according to the present invention

For example, as depicted in FIG. 4, using the previously described example of 120 Elm Street, a bounding box 401 may be created around the geocoded point 301. The exemplary value used from the street density determination step 240 may be illustrated as vectors 410 and 420 extending away from the street of the geocoded point 301. According to the exemplary street density, the vectors 410 and 420 may each have a distance of 500 meters. In addition, the bounding range may be illustrated as vectors 430 and 440 extending along the street of the geocoded point 301, away from the geocoded point 301. According to the exemplary estimate of step 250, the vectors 430 and 440 may each have a bounding range distance of 100 meters. Therefore, the bounding box 401 may be 200 m by 1000 m rectangle having a focal point located at the geocoded point 301. Thus, the actual location for an excavation site for the exemplary address of 120 Elm Street, according to the exemplary embodiments of the present invention, may be definitively placed within the bounding box 401.

According to an alternative embodiment of the present invention, a slightly more precise value can be obtained by combining the bounding range of step 250 with maximum uncertainty value of step 240 in vector form. In other words, compute the vector sum value of using the respective vector values from one of the street density vectors 410 and 420 in combination with one of the bounding range vectors 430 and 440 extending away from the geocoded point 301

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A method, comprising:
   receiving a geocode request for a location including a textual description of the location;
   selecting a test for geocoding the location;
   geocoding the location using the selected test; and
   determining a bounding area around the location indicating at least one maximum distance range from the location.

2. The method according to claim 1, further including:
   determining a street density of a region including the location; and estimating, from the street density, a maximum uncertainty for the representation of the location.

3. The method according to claim 2, further including:
determining a bounded range within endpoints of an address block range for locating the location, wherein the bounding area is defined by the bounding range and the maximum uncertainty for the location.

4. The method according to claim 1, wherein the test for geocoding the location is selected from a plurality of geocoding tests performed in parallel, each of the geocoding tests being a method for obtaining a latitude and a longitude coordinate from the textual data.

5. The method according to claim 4, further including:
penalizing at least one of the plurality of geocoding tests when the at least one the plurality of geocoding tests yields in an inaccurate result by decreasing a weight coefficient for the at least one of the plurality of geocoding tests, wherein decreasing the weight coefficient decreases the likelihood the a particular test will be selected when selecting the optimal test.

6. The method according to claim 4, further including:
rewarding at least one of the plurality of geocoding tests when the at least one the plurality of geocoding tests yields in an accurate result by increasing a weight coefficient for the at least one of the plurality of geocoding tests, wherein increasing the weight coefficient increases the likelihood the a particular test will be selected when selecting the optimal test.

7. The method according to claim 1, wherein the selecting the test incorporates a confidence factor, the weight coefficient is a function of the location indicating a relative degree of certainty in the result for a plurality of geocoding tests.

8. The method according to claim 1, wherein the geocode request corresponds to a site for an underground excavation.

9. The method according to claim 8, further includes:
determining that the site underground excavation is within a proximity of one or more underground assets when the one or more underground assets is located within the bounding area.

10. A system, comprising:
a plurality of geocoding tests for converting a textual description of a location into a geocoded point;
an error estimation application determining the likelihood a particular geocoding test will be selected as an optimal test and selecting the optimal test; and
an asset management device performing the optimal test and defining a bounding box around the geocoded point indicating at least one maximum distance range from the geocoded point to the location.

11. The system according to claim 10, wherein the error estimation application penalizes at least one of the plurality of geocoding tests when the at least one the plurality of geocoding tests yields in an inaccurate result by decreasing a weight coefficient for the at least one of the plurality of geocoding tests, wherein decreasing the weight coefficient decreases the likelihood the a particular test will be selected when selecting the optimal test, and rewards at least one of the plurality of geocoding tests when the at least one the plurality of geocoding tests yields in an accurate result by increasing a weight coefficient for the at least one of the plurality of geocoding tests, wherein increasing the weight coefficient increases the likelihood the a particular test will be selected when selecting the optimal test.

12. The system according to claim 10, wherein the error estimation application incorporates a confidence factor, the weight coefficient is a function of the location indicating a relative degree of certainty in the result for a plurality of geocoding tests.

13. The system according to claim 10, wherein the assert management device determines a street density of a region including the geocoded point, and estimates, from the street density, a maximum uncertainty for the representation by the geocoded point of the location.

14. The system according to claim 10, wherein the assert management device determines a bounded range within endpoints of an address block range for locating the location, wherein the bounding box is defined by the bounding range and the maximum uncertainty for the geocoded point.

15. The system according to claim 10, wherein the optimal test for geocoding the textual description is selected from a plurality of geocoding tests performed in parallel, each of the geocoding test being a method for obtaining a latitude and a longitude coordinate from the textual data.

16. The system according to claim 10, wherein the geocode request corresponds to a site for an underground excavation and the assert management device determine that the site underground excavation is within a proximity of one or more underground assets when the one or more underground assets is located within the bounding box.

17. A computer readable storage medium including a set of instructions executable by a processor, the set of instructions being operable to:
receive a geocode request for a location including a textual description of the location;
select a test for geocoding the location;
geocode the location using the selected test;
determine a bounding area around the location indicating at least one maximum distance range from the location.

18. The computer readable storage medium according to claim 17, wherein the set of instructions are further operable to:
determine a street density of a region including the location; and
estimate, from the street density, a maximum uncertainty for the representation of the location.

19. The computer readable storage medium according to claim 18, wherein the set of instructions are further operable to:
determine a bounded range within endpoints of an address block range for locating the location, wherein the bounding area is defined by the bounding range and the maximum uncertainty for the location.

* * * * *